Patented July 21, 1936

2,048,499

UNITED STATES PATENT OFFICE 2,048,499

GELATINE SOLUTIONS

Walter Gellendien, Berlin-Charlottenburg, and Johann Eggert, Berlin, Germany, assignors to Deutsche Hydrierwerke Aktiengesellschaft, Berlin-Charlottenburg, Germany, a corporation of Germany No Drawing. Application April 5, 1935, Serial No. 14,822. In Germany April 7, 1934

6 Claims. (Cl. 87—7)

For the manufacture of gelatine products of many kinds such as gelatine foils, gelatine capsules and the like, one generally proceeds from concentrated aqueous solutions of the gelatine. During the treatment those gelatine solutions, containing up to 55% and more but in general 25 to 45% of gelatine, are to be kept within determined temperatures, usually within 20 and 55° C., in order to attain the degree of consistency which allows the pouring out of the gelatine solutions or the sticking of same, in a determined film-thickness, on immersing bodies, and which at the same time warrants a quick congealing of the gelatine mass after its moulding. Now, when working such solutions a considerable disadvantage makes itself perceptible by the necessity to keep the required temperatures rigorously within rather restricted limits in order to prevent, on the one hand, an untimely congealing or a film formation on the surface of the gelatine solution respectively and, on the other hand, an undesired liquefaction of the gelatine mass. Those drawbacks are particularly serious, because for the regular manufacture of gelatine products it is throughout the question of important amounts of gelatine solutions for which in the operation on a large scale the exact adjusting of the required temperature cannot normally be obtained but under a most careful control attended with a rather high expenditure of time and money.

Now it has been found that those drawbacks can be avoided in a most simple and advantageous manner i. e. in incorporating into the gelatine solutions additions of hydrogenation products of the furfural and particulariy of the furfuryl alcohol or tetrahydrofurfuryl alcohol respectively. By means of such additions one obtains a remarkable fastness of the gelatine solutions to rise and fall of temperature and moreover a notable diminution of the adhering strength of the gelatine products when the gelatine solution is poured out on a base.

For example in making gelatine capsules according to the working methods hitherto in use the gelatine solution containing 45% of gelatine had to be kept at the exact temperature of 40° C., since already a deviation of 2° C. from this temperature proved very disadvantageous in giving rise to film formation on the surface of the gelatine solution, to unequal congealing and similar inconveniences. Now by adding an amount of 2% of furfuryl alcohol to the aforesaid solutions, one obtains a remarkable better fastness of the gelatine solutions to rise and fall of temperature. The thus improved solutions are indeed very stable at temperatures from 10 to 12° C., and their stability is still enhanced by an increased proportion of furfuryl alcohol that makes it possible to work without ado with a temperature of 28° C. the same gelatine solutions which hitherto had carefully to be kept at 40° C. Instead of the furfuryl alcohol one may likewise usefully employ the tetrahydrofurfuryl alcohol. In such a way one therefore obtains a considerable enhancement of the security of manufacturing together with a remarkable saving of calories.

What we claim is:

1. Manufacture of concentrated, easily fluid gelatine solutions, comprising the addition of material of the group consisting of furfuryl alcohol and tetrahydrofurfuryl alcohol to the gelatine solutions.

2. Manufacture of concentrated, easily fluid gelatine solutions, comprising the addition of furfuryl alcohol to the gelatine solutions.

3. Manufacture of concentrated, easily fluid gelatine solutions, comprising the addition of tetrahydrofurfuryl alcohol to the gelatine solutions.

4. Gelatine solutions containing material of the group consisting of furfuryl alcohol and tetrahydrofurfuryl alcohol.

5. A high concentrated, easily fluid aqueous gelatine solution containing 2% of furfuryl alcohol.

6. A high concentrated, easily fluid aqueous gelatine solution containing 5% of tetrahydrofurfuryl alcohol.

JOHANN EGGERT.
WALTER GELLENDIEN.